US009604328B2

(12) United States Patent
Lin et al.

(10) Patent No.: US 9,604,328 B2
(45) Date of Patent: *Mar. 28, 2017

(54) HEAT SINK STRUCTURE AND METHOD OF MANUFACTURING SAME

(71) Applicant: Asia Vital Components Co., Ltd., New Taipei (TW)

(72) Inventors: Sheng-Huang Lin, New Taipei (TW); Kuo-Sheng Lin, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 71 days.

This patent is subject to a terminal disclaimer.

(21) Appl. No.: 14/528,312

(22) Filed: Oct. 30, 2014

(65) Prior Publication Data

US 2015/0052731 A1 Feb. 26, 2015

Related U.S. Application Data

(62) Division of application No. 13/610,104, filed on Sep. 11, 2012, now abandoned.

(30) Foreign Application Priority Data

Aug. 1, 2012 (TW) .............................. 101127732 A

(51) Int. Cl.
*B23P 19/027* (2006.01)
*B23P 15/26* (2006.01)
(Continued)

(52) U.S. Cl.
CPC .......... *B23P 19/027* (2013.01); *B21D 39/038* (2013.01); *B21D 53/02* (2013.01);
(Continued)

(58) Field of Classification Search
CPC ..... B23P 19/027; B23P 15/26; B23P 2700/10; B21K 25/00; B21D 53/02; B21D 39/038;
(Continued)

(56) References Cited

U.S. PATENT DOCUMENTS

2014/0352150 A1* 12/2014 Lin ........................ F28F 7/00
29/890.046

FOREIGN PATENT DOCUMENTS

| TW | I343470 A | 7/2010 |
| TW | M390644 U1 | 10/2010 |
| TW | I345147 B | 7/2011 |

* cited by examiner

*Primary Examiner* — John C Hong
(74) *Attorney, Agent, or Firm* — C. G. Mersereau; Nikolai & Mersereau, P.A.

(57) ABSTRACT

A heat sink structure and a method of manufacturing same are disclosed. The heat sink structure includes a main body and a plurality of radiating fins. The main body has a plurality of coupling flutes circumferentially spaced along an outer surface thereof and longitudinally extended from a first end to a second thereof. The radiating fins respectively have a bent section integrally located between a first and a second heat radiating section. To quickly assemble the radiating fins to the main body, the radiating fins are disposed in a forming mold, and the main body is mechanically driven into the forming mold at a high speed, so that the bent sections of the radiating fins are longitudinally forced into the coupling flutes from the first to the second end of the main body to thereby tightly connect the radiating fins to the main body.

6 Claims, 16 Drawing Sheets

(51) Int. Cl.
  *B21D 39/03* (2006.01)
  *B21D 53/02* (2006.01)
  *B21K 25/00* (2006.01)
  *F28D 21/00* (2006.01)

(52) U.S. Cl.
  CPC .............. *B21K 25/00* (2013.01); *B23P 15/26* (2013.01); *B23P 2700/10* (2013.01); *F28D 2021/0029* (2013.01); *Y10T 29/49* (2015.01); *Y10T 29/4935* (2015.01); *Y10T 29/49378* (2015.01); *Y10T 29/49945* (2015.01)

(58) Field of Classification Search
  CPC ........... Y10T 29/4935; Y10T 29/49378; Y10T 29/49945; Y10T 29/49; F28D 2021/0029
  See application file for complete search history.

HEAT SINK STRUCTURE AND METHOD OF MANUFACTURING SAME

CROSS-REFERENCE TO RELATED APPLICATIONS

The present application is a division of U.S. patent application Ser. No. 13/610,104, filed on Sep. 11, 2012, titled Heat Sink Structure and Method of Manufacturing Same, listing Sheng-Huang Lin and Kuo-Sheng Lin as inventors. This application claims the priority benefit of Taiwan patent application number 101127732 filed Aug. 1, 2012.

FIELD OF THE INVENTION

The present invention relates to a heat sink structure, and more particularly to a ring-shaped heat sink structure. The present invention also relates to a method of manufacturing the above heat sink structure.

BACKGROUND OF THE INVENTION

Conventionally, a cylindrical heat sink includes a cylindrical body and a plurality of radiating fins connected to a circumferential surface of the cylindrical body.

One prior art is a method for tightly connecting radiating fins to a cylindrical heat sink and device using the cylindrical heat sink. The method mainly includes the steps of using a power source to drive a mold to generate a stepped rotary movement; providing a cylindrical body having a plurality of recesses formed on a circumferential surface thereof, and fixing the cylindrical body on the mold; providing a set of radiating fins and positioning the same to one side of the mold; intermittently rotating the cylindrical body to align the recesses with the radiating fins, and using a fin insertion device to push the radiating fins and sequentially insert them into the recesses on the cylindrical body until all the recesses have the radiating fins inserted therein; and tightly connecting the radiating fins to the recesses via a subsequent tightening process, so that the radiating fins are firmly fixed on and around the cylindrical body to form a heat sink. With the above described heat sink manufacturing method, the radiating fins are sequentially inserted into the recesses on the cylindrical body one by one, and the subsequent tightening process involves complicated manufacturing steps. As a result, an extended time is needed to manufacture the heat sink.

Another prior art is a heat dissipation structure with assembled radiating fins. The heat dissipation structure mainly includes a metal base and a plurality of radiating fins. Each of the radiating fins is formed by integrally stamping and bending a metal sheet into a U-shaped member, so that the U-shaped radiating fin includes two heat radiating sections in the form of two flat plates and an elastic retaining section in the form of a U-shaped plate. Two lateral sides of the elastic retaining section provide an elastic restoring force and are integrally connected to the two heat radiating sections. The two lateral sides of the retaining section can be pushed toward each other to deform the retaining section. Each deformed retaining section of the radiating fin can be inserted into one of a plurality of grooves provided on the metal base. The grooves respectively have a configuration corresponding to that of the elastic retaining section and have a size-reduced open side. Due to the elastic restoring force thereof, the elastic retaining section received in each groove can have two lateral outer surfaces firmly pressed against two opposite edges of the open side of the groove, so that all the radiating fins can be inserted onto the metal base to form a heat sink. In the above described heat sink manufacturing method, the elastic retaining sections must be compressed before they are sequentially inserted into the grooves. Therefore, a long time is needed to manufacture the heat sink. Meanwhile, the radiating fins are not tightly fitted onto the metal base and tend to separate therefrom under an external force or a longitudinal push force applied thereto.

In brief, the prior art heat sink structures have the following disadvantages: (1) they all involve complicated manufacturing steps and accordingly requiring extended manufacturing time; (2) the radiating fins are not tight-fitted to the cylindrical body or the metal base of the heat sink structure and tend to separate therefrom under an external force or a longitudinal push applied thereto.

It is therefore tried by the inventor to develop an improved heat sink structure and a method of manufacturing same, so as to solve the problems and drawbacks in the conventional heat sink structures.

SUMMARY OF THE INVENTION

A primary object of the present invention is to provide a heat sink structure and a method of manufacturing same, in which a mechanical process is used to produce a high-pressure gas for driving a main body to connect with a plurality of radiating fins at a high speed and thereby form the heat sink structure quickly.

Another object of the present invention is to provide a heat sink structure and a method of manufacturing same, so that radiating fins can be quickly assembled to a main body to form the heat sink structure.

A further object of the present invention is to provide a heat sink structure and a method of manufacturing same, so that radiating fins can be reinforced and tightly connected to a main body to form the heat sink structure.

A still further object of the present invention is to provide a heat sink structure having enhanced heat dissipation efficiency, and a method of manufacturing the heat sink structure.

To achieve the above and other objects, the heat sink structure according to a preferred embodiment of the present invention includes a main body and a plurality of radiating fins. The main body has a first end and an opposite second end, and is extended in a longitudinal direction between the first end and the second end. The main body is provided on an outer surface with a plurality of circumferentially spaced coupling flutes, which longitudinally extend from the first end to the second end. The radiating fins are assembled to and located around the main body. Each of the radiating fins has a first heat radiating section and a second heat radiating section formed at two lateral portions thereof, and a bent section located between the first and the second heat radiating section and shaped corresponding to the coupling flute. The main body is driven by a mechanical process toward the radiating fins at a high speed, so that the bent sections of the radiating fins are forced into the coupling flutes via the first end of the main body and longitudinally moved to the second end of the main body at a high speed, bringing the bent sections of the radiating fins to tightly connect to the coupling flutes.

To achieve the above and other objects, the method of manufacturing heat sink structure according to a preferred embodiment of the present invention includes the following steps: (i) providing a forming mold, which has an inner wall surface, a top surface and a plurality of slots; the inner wall surface enclosing an inner space, the slots being radially outward extended from the inner wall surface to locate around and communicate with the inner space, and the slots respectively having an upper end that extends through the top surface; (ii) providing a main body, which is longitudinally extended between a first end and a second end thereof and has a plurality of coupling flutes circumferentially spaced on an outer surface thereof and longitudinally extended from the first end to the second end; and setting the first end of the main body in the inner space of the forming mold; (iii) providing a plurality of radiating fins and disposing the radiating fins in the slots; each of the radiating fins having a first and a second heat radiating section and a bent section located between the first and the second heat radiating section, and each of the slots having at least one radiating fin disposed therein with the bent section of the radiating fin radially projected from the inner wall surface into the inner space of the forming mold; and (iv) using a mechanical process to drive the main body into the inner space at a high speed, so that the main body moves relative to the radiating fins and the bent sections of the radiating fins are forced into the coupling flutes and longitudinally moved along the coupling flutes to the second end of the main body at a high speed, bringing the bent sections and the coupling flutes to tightly connect to one another.

With the arrangements and the manufacturing steps according to the present invention, the main body and the radiating fins can be quickly assembled together to reduce the time needed for manufacturing the heat sink structure while the radiating fins are effectively tightly connected to the main body to ensure enhanced heat dissipation efficiency of the heat sink structure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
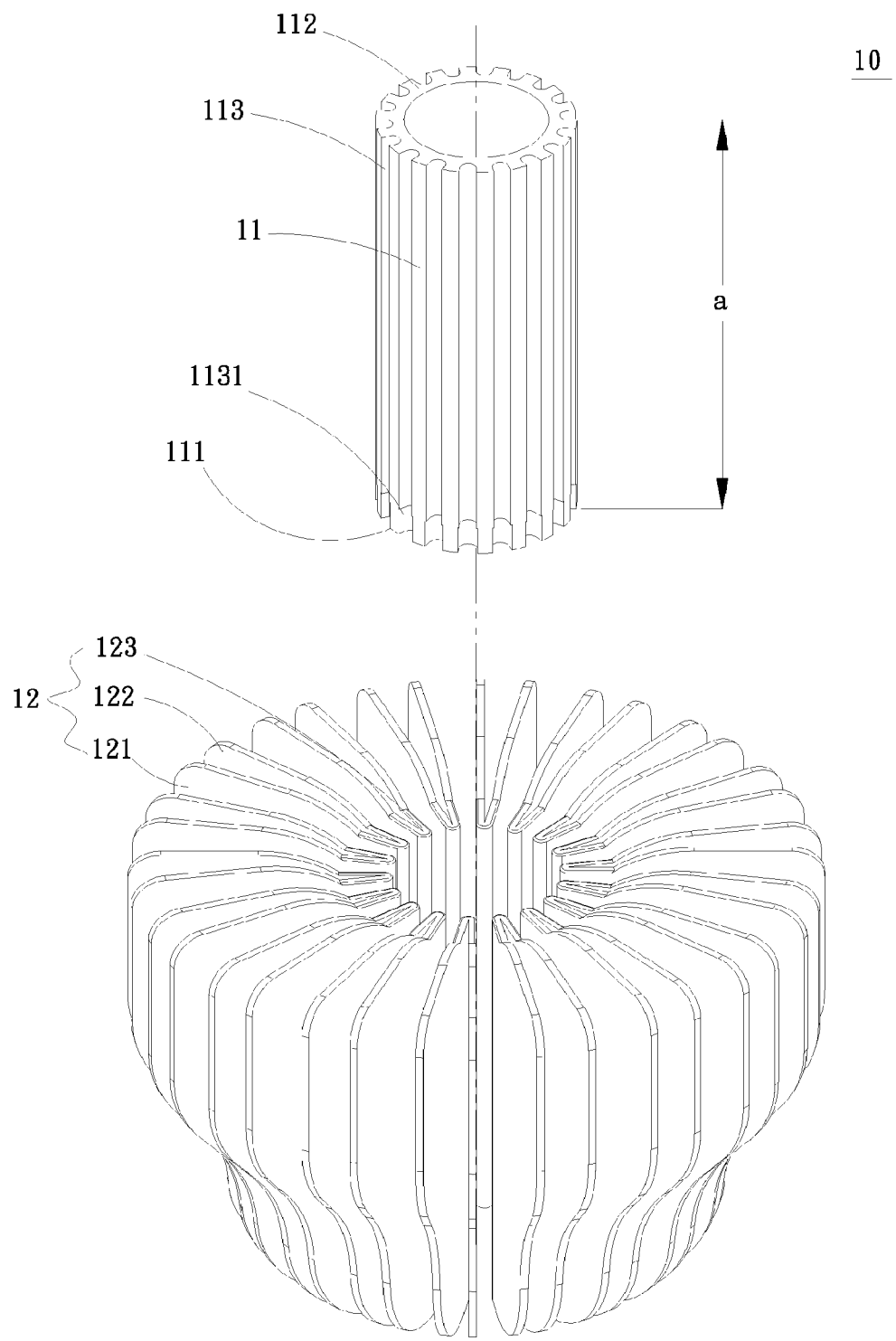
FIG. 1 is an exploded perspective view of a heat sink structure according to a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
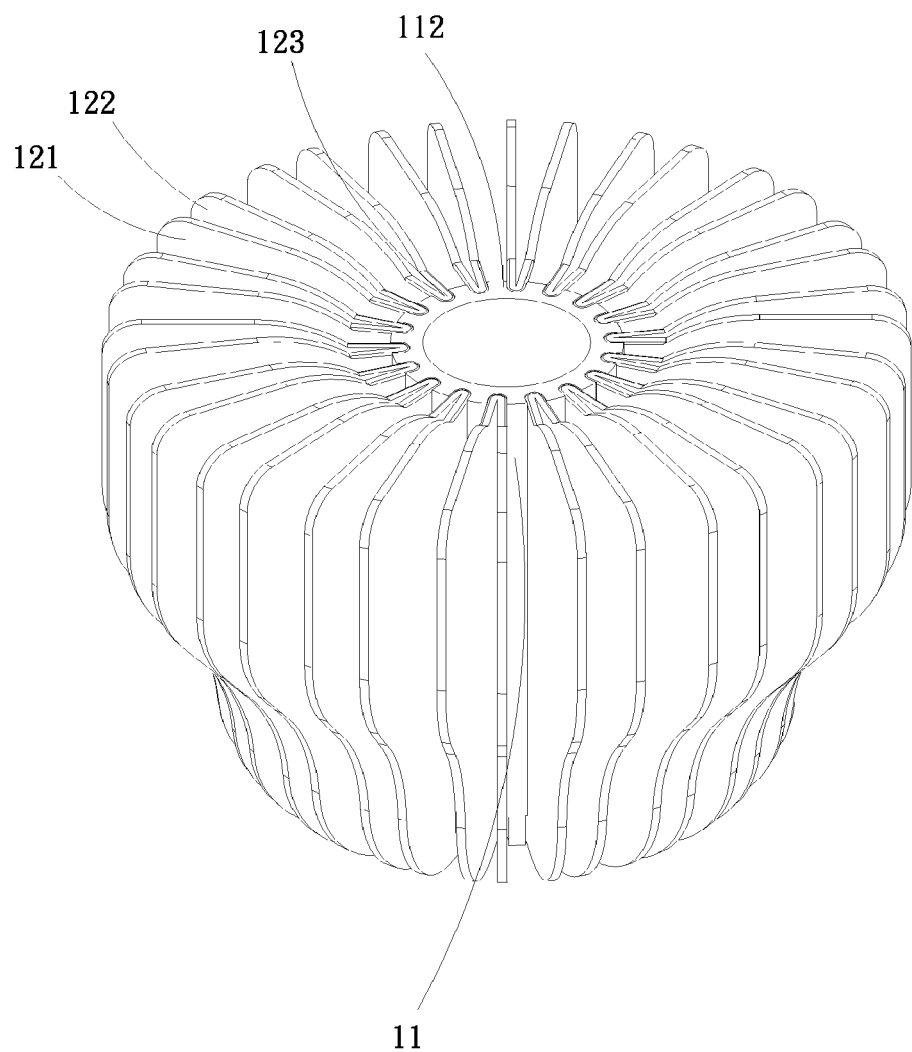
FIG. 2 is an assembled view of FIG. 2.
Figure 3:
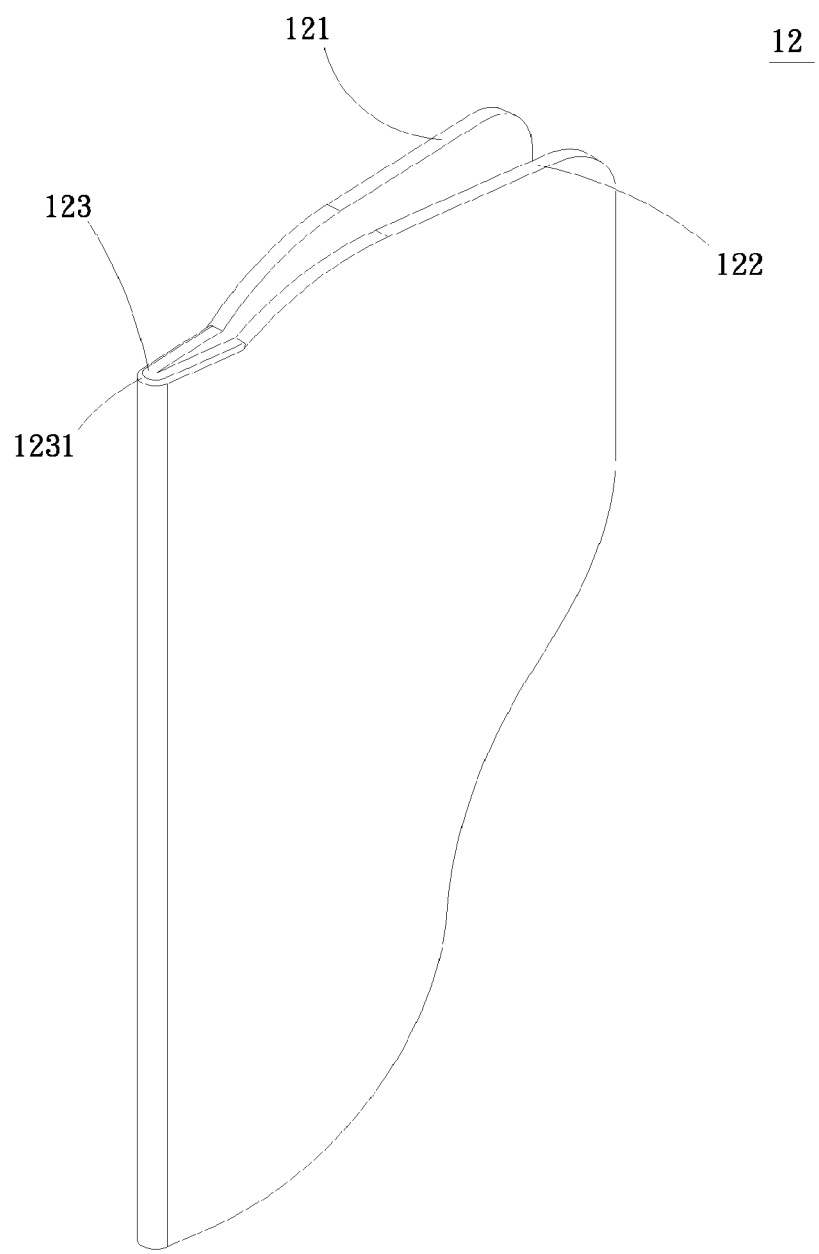
FIG. 3 is a perspective view of a radiating fin for the heat sink structure according to the first preferred embodiment of the present invention.

Please refer to FIGS. 1 and 2 that are exploded and assembled perspective views, respectively, of a heat sink structure 10 according to a first preferred embodiment of the present invention, and to FIG. 3 that is a perspective view of a radiating fin 12 for the heat sink structure 10 in the first preferred embodiment thereof. As shown, the heat sink structure 10 includes a main body 11 and a plurality of radiating fins 12.

The main body 11 has a first end 111 and an opposite second end 112, and is extended in a longitudinal direction "a" between the first end 111 and the second end 112. The main body 11 is provided on an outer surface with a plurality of circumferentially spaced coupling flutes 113, which extend in the longitudinal direction "a" from the first end 111 to the second end 112 and communicate with the first and the second end 111, 112.

The main body 11 is further provided in each of the coupling flutes 113 adjoining the first end 111 with a force-in section 1131, which communicates with the coupling flute 113. The force-in sections 1131 are provided to enable easy alignment and coupling of the first end 111 of the main body 11 with the radiating fins 12. In the illustrated first preferred embodiment, the force-in sections 1131 has a width slightly larger than that of the coupling flutes 113, so that the radiating fins 12 can be more easily moved into the coupling flutes 113 from the first end 111 of the main body 11.

The radiating fins 12 are coupled to the coupling flutes 113 to space around the main body 11. Each of the radiating fins 12 has a first heat radiating section 121 and a second heat radiating section 122 formed at two lateral portions thereof, and a bent section 123 located between the first and the second heat radiating section 121, 122 and shaped corresponding to the coupling flute 113. It is the bent sections 123 of the radiating fins 12 that are longitudinally forced into the coupling flutes 113 of the main body 11 via the force-in sections 1131 to move from the first end 111 toward the second 112 in the longitudinal direction "a" and become tightly connected to the coupling flutes 113.

When the bent sections 123 longitudinally reach at the second end 112 to become tightly connected to the coupling flutes 113, two lateral portions of the bent sections 123 are horizontally tightly pressed against an inner surface of the coupling flutes 113. The bent section 123 can be formed at a middle portion or at a non-middle portion of each radiating fin 12, so that the first heat radiating section 121 and the second heat radiating section 122 respectively extended from the two lateral portions of the bent section 123 are identical to or different from each other in surface area, volume, thickness and shape. When the bent sections 123 are fully forced into and tightly connected to the coupling flutes 113, the first and the second heat radiating sections 121, 122 are radially, straightly and outwardly extended from the main body 11. The bent sections 123 respectively have an upper end, an outer edge of which is rounded or chamfered to form a lead-in section 1231, so that the bent sections 123 can be more smoothly forced into the force-in sections 1131 and the coupling flutes 113.

Figure 4:
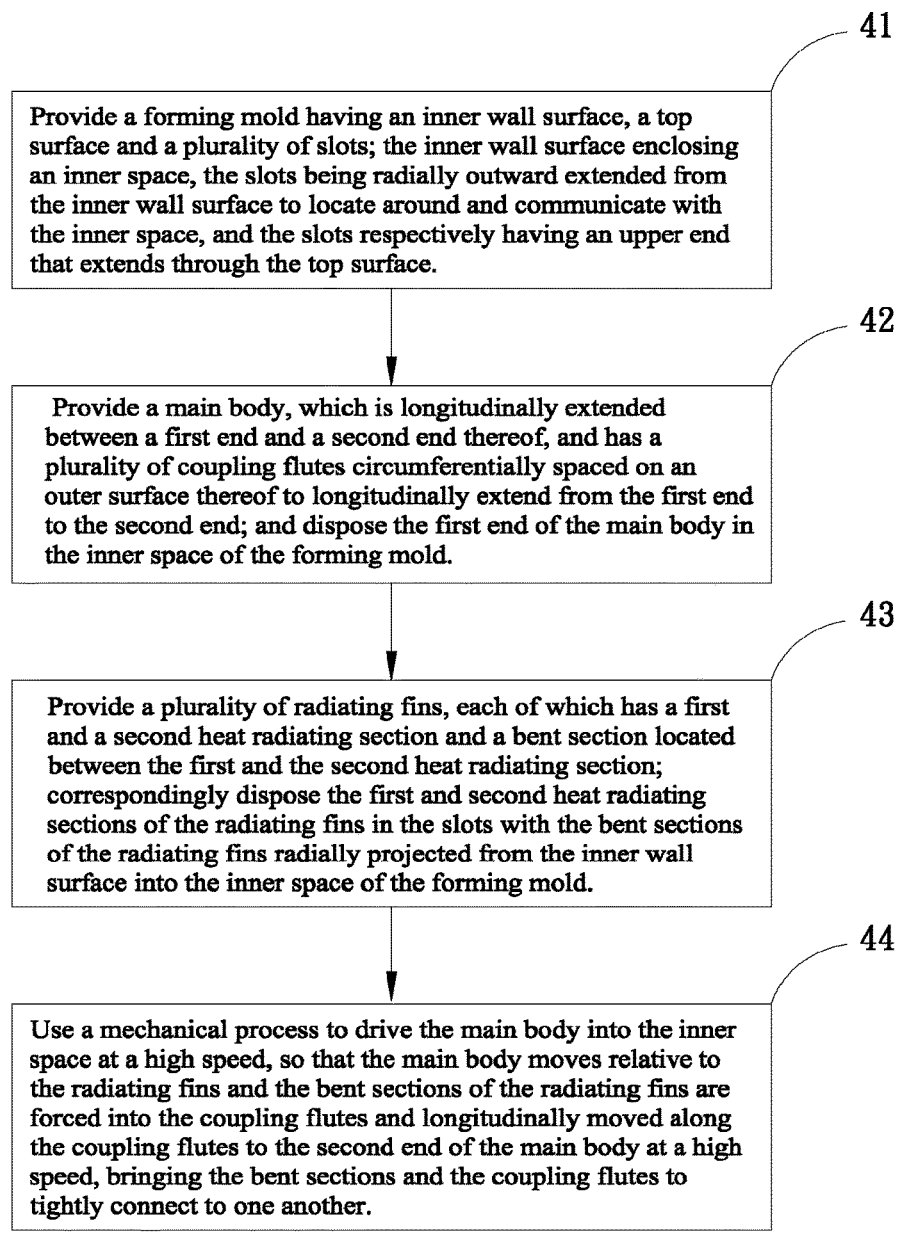
FIG. 4 is a flowchart showing the steps included in a method of manufacturing heat sink structure according to a first preferred embodiment of the present invention.

The present invention also provides a method of manufacturing heat sink structure. FIG. 4 shows the flow process according to a first embodiment of the manufacturing method of the present invention includes four steps 41, 42, 43 and 44, which are now described in more details with reference to FIGS. 5, 6 and 7.

Figure 5:
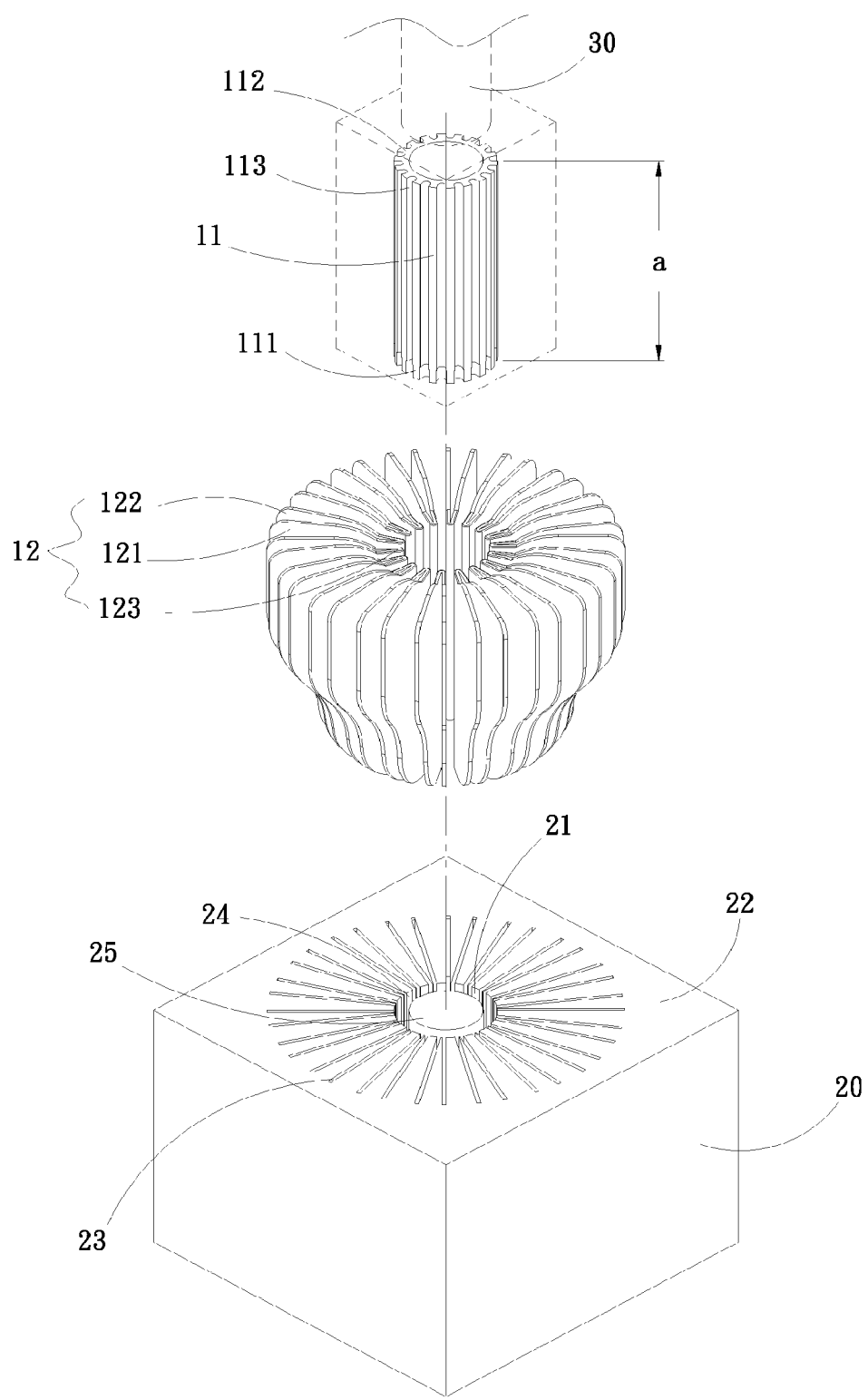
FIGS. 5, 6 and 7 show different steps of the heat sink structure manufacturing method according to the first preferred embodiment of the present invention.

In Step 41, as shown in FIG. 5, a forming mold 20 is provided. The forming mold 20 has an inner wall surface 21, a top surface 22, and a plurality of slots 23. The inner wall surface 21 encloses an inner space 24, in which a central body 25 is provided. The slots 23 are radially outward extended from the inner wall surface 21 to locate around and communicate with the inner space 24. The slots 23 respectively have an upper end that extends through the top surface 22.

In Step 42, still as shown in FIG. 5, a main body 11 is provided. The main body 11 has a first end 111 and an opposite second end 112, and is extended in a longitudinal direction "a" between the first end 111 and the second end 112. The main body 11 is provided on an outer surface with a plurality of circumferentially spaced coupling flutes 113, which extend in the longitudinal direction "a" from the first end 111 to the second end 112 and are respectively provided adjoining the first end 111 with a force-in section 1131 (referring to FIG. 1). The first end 111 of the main body 11 is disposed in the inner space 24 of the forming mold 20.

In Step 43, still as shown in FIG. 5, a plurality of radiating fins 12 is provided. The radiating fins 12 respectively have a first heat radiating section 121, a second heat radiating section 122, and a bent section 123 located between the first and the second heat radiating section 121, 122. The first and second heat radiating sections 121, 122 are correspondingly disposed in the slots 23 with the bent sections 123 radially projected from the inner wall surface 21 into the inner space 24 of the forming mold 20. The bent sections 123 projected into the inner space 24 are in one-to-one correspondence with the force-in sections 1131 of the coupling flutes 113.

Figure 6:
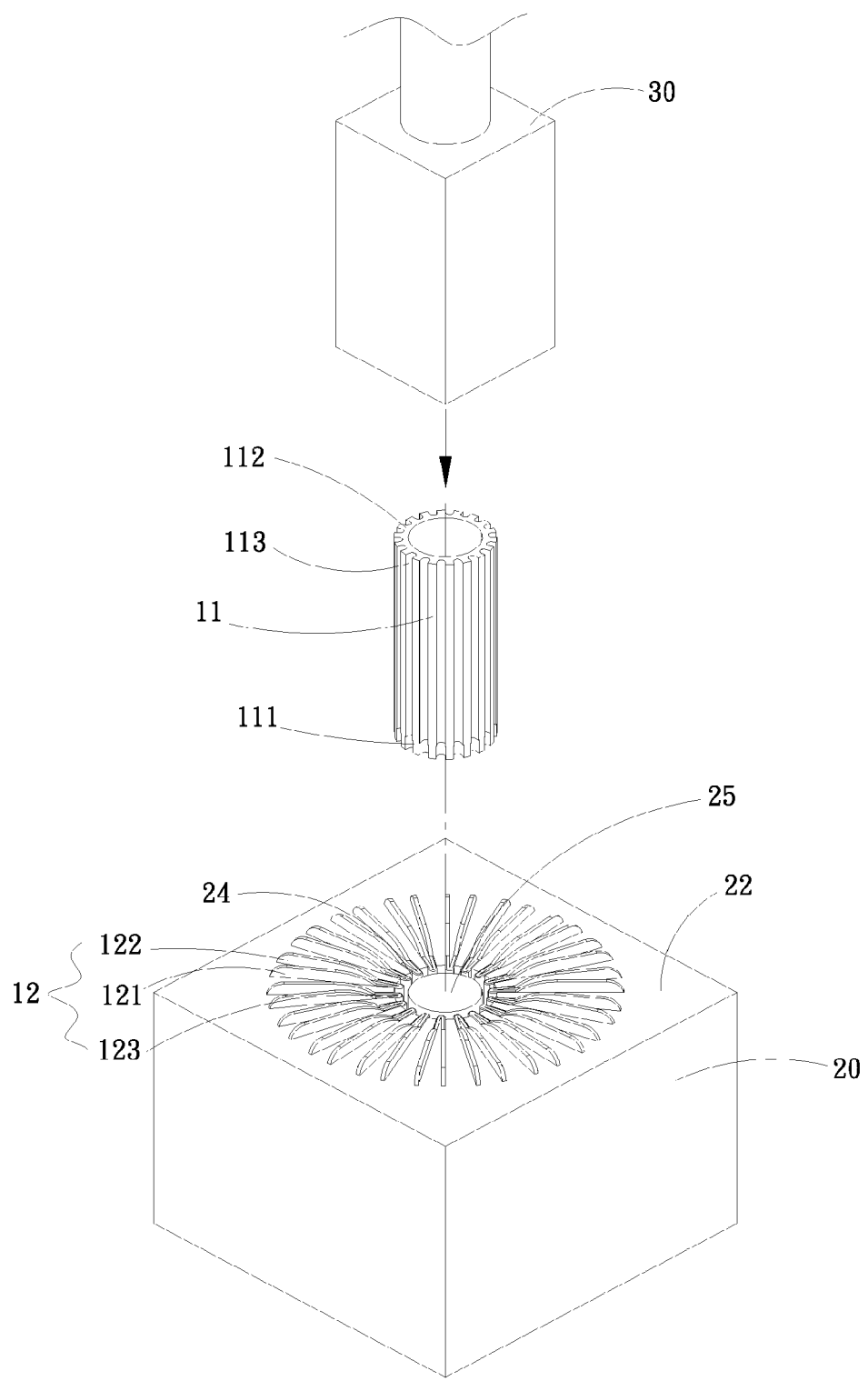
Figure 7:
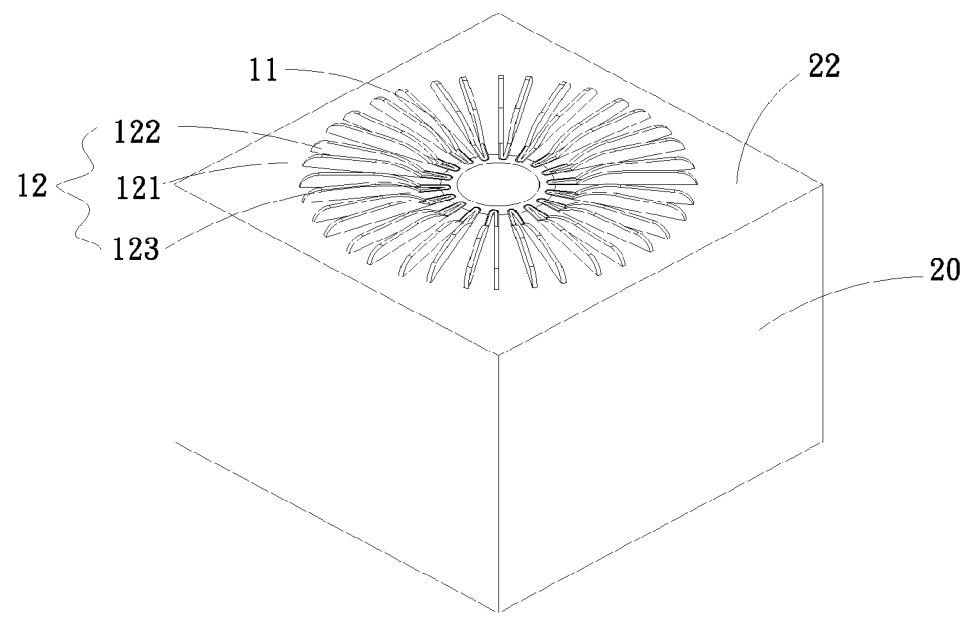

In Step 44, as shown in FIGS. 5, 6 and 7, use a mechanical process to drive the main body 11 into the inner space 24 at a high speed, so that the main body 11 moves relative to the radiating fins 12, and the bent sections 123 of the radiating fins 12 are forced into the coupling flutes 113 and longitudinally moved along the coupling flutes 113 to the second end 112 of the main body 11 at a high speed, bringing the bent sections 123 to tightly connect to the coupling flutes 113.

In the above-mentioned mechanical process, a gas compressing machine 30 is used to produce a compressed gas for using as a power source. At the instant of releasing, the compressed gas generates a power to push the main body 11 into the inner space 24 at a very high speed, so that the force-in sections 1131 and the coupling flutes 113 are quickly lowered from the top surface 22 of the forming mold 20 and the bent sections 123 are forced into the coupling flutes 113 via the force-in sections 1131 to firmly and tightly connect to the coupling flutes 113. When the bent sections 123 are fully forced to the second end 112 of the main body 11, two lateral portions of the bent sections 123 are horizontally tightly pressed against and attached to inner wall surfaces of the coupling flutes 113. Meanwhile, the first and the second heat radiating sections 121, 122 are radially, straightly and outwardly extended from the main body 11 to thereby form a heat sink 10. With the central body 25 provided in the inner space 24, it is able to ensure accurate downward movement of the main body 11 along the central body 25 when the main body 11 is driven into the inner space 24 at a high speed. The gas compressing machine 30 can be but not limited to an air compressor.

Please refer to FIG. 2 again. After the Step 44 is completed, the heat sink 10 is removed from the forming mold 20.

While the main body 11 in the preferred embodiment is illustrated as a hollow body, it can be a solid body in another operable embodiment of the present invention. In the case of a solid main body 11, the central body 25 is omitted from the inner space 24 of the forming mold 20.

With the above manufacturing method, the main body 11 and the radiating fins 12 can be very quickly assembled to one another while an enhanced tight connection of the radiating fins 12 to the main body 11 can be effectively achieved. Further, the time needed to assemble and complete the heat sink structure 10 is largely reduced.

Figure 8A:
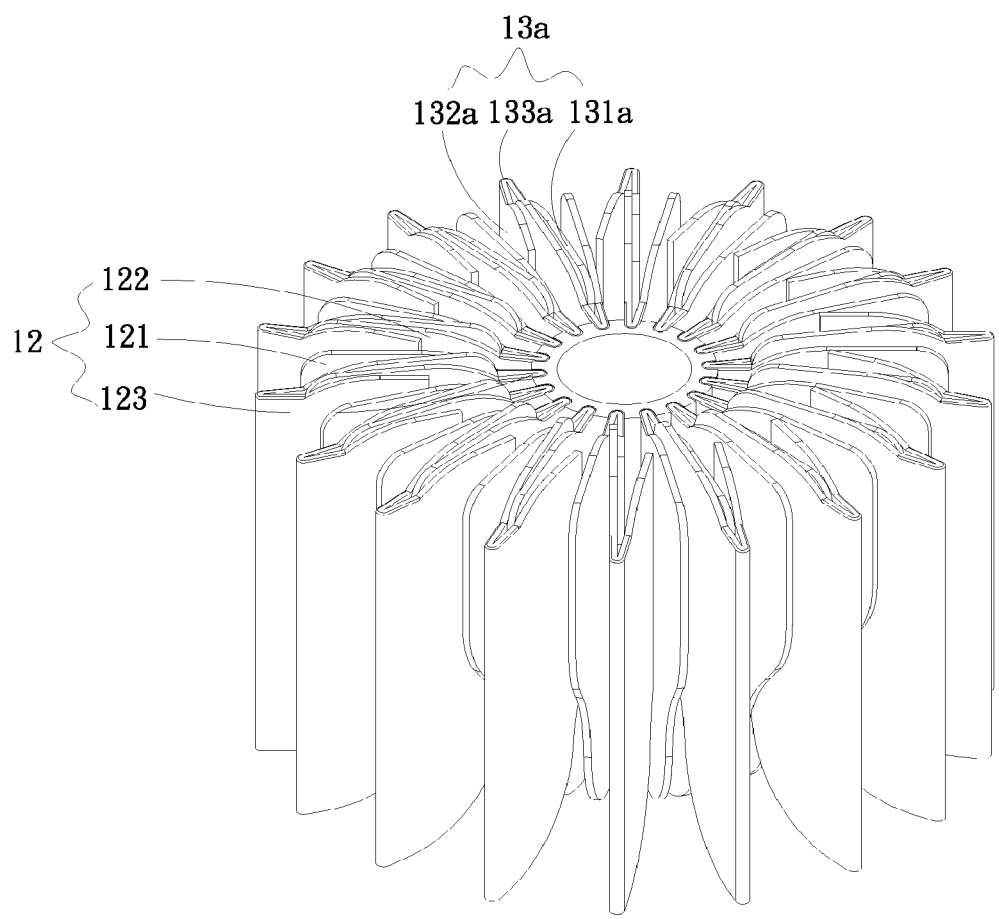
FIG. 8A is an assembled perspective view of a heat sink structure according to a second preferred embodiment of the present invention.
Figure 8B:
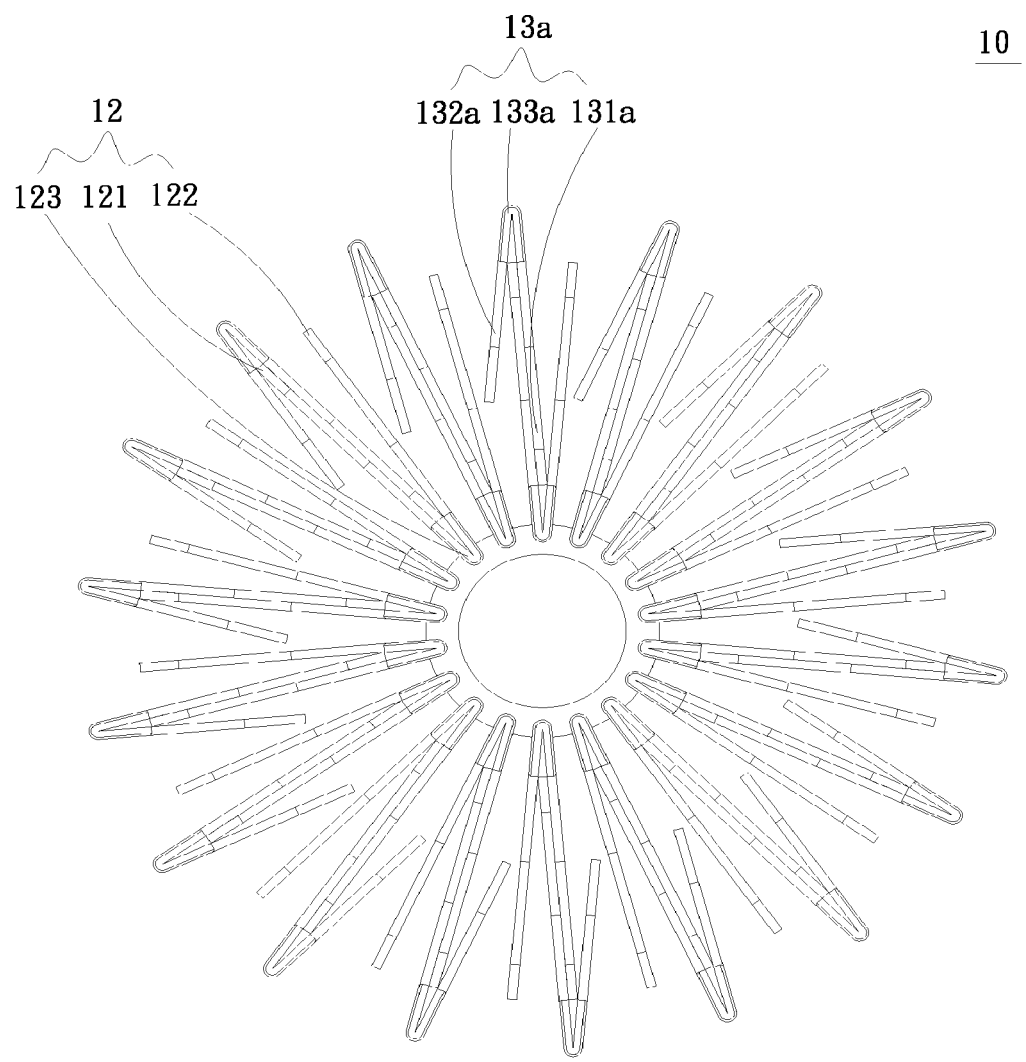
FIG. 8B is a top view of FIG. 8A.

Please refer to FIGS. 8A and 8B that are perspective and top views, respectively, of a heat sink structure 10 according to a second preferred embodiment of the present invention. As shown, the heat sink structure 10 in the second preferred embodiment is generally structurally similar to the first embodiment, except that it further includes a plurality of second radiating fins 13a. The second radiating fins 13a respectively have a configuration similar to that of the radiating fins 12. More specifically, each of the second radiating fins 13a has a third heat radiating section 131a and a fourth heat radiating section 132a formed at two lateral portions thereof, and a second bent section 133a located between the third and the fourth heat radiating section 131a, 132a. The second radiating fins 13a assembled to the heat sink structure 10 are disposed reverse to the radiating fins 12. More specifically, each third heat radiating section 131a is located between the first and the second heat radiating section 121, 122 of one radiating fin 12 and clamped in the bent section 123 of the radiating fin 12, while the first heat radiating section 121 of the radiating fin 12 is clamped in the second bent section 133a of the second radiating fin 13a. By providing the second radiating fins 13a on the heat sink structure 10 in the above manner, the radiating fins 12 are structurally reinforced by the third heat radiating sections 131a and can provide enhanced heat transfer and heat dissipation effects.

Figure 8C:
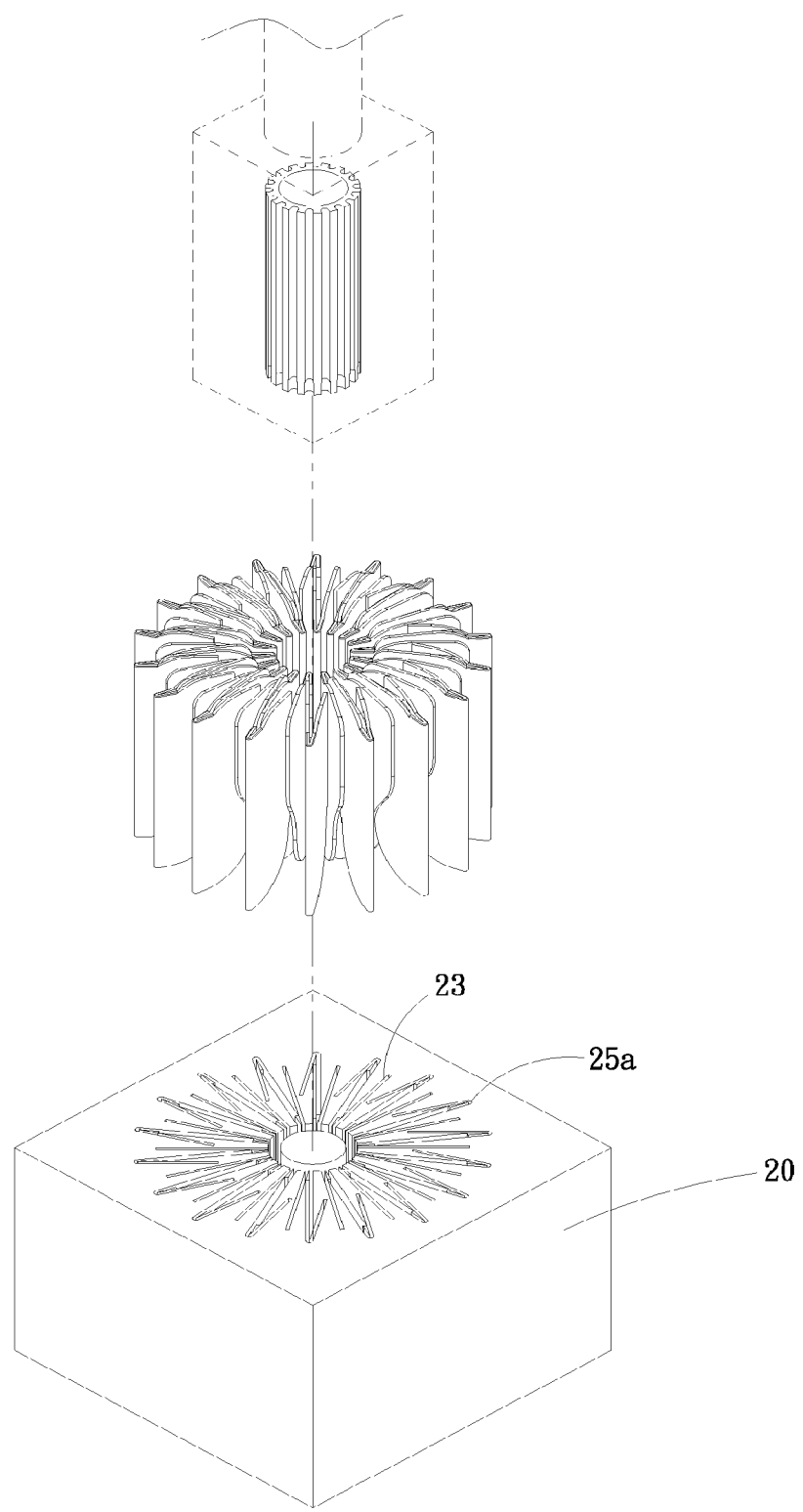
FIG. 8C shows the method of manufacturing heat sink structure according to a second preferred embodiment of the present invention.

FIG. 8C shows the method of manufacturing heat sink structure according to a second preferred embodiment of the present invention. To manufacture the heat sink structure 10 shown in FIGS. 8A and 8B, the forming mold 20 is further provided with a plurality of second slots 25a for correspondingly receiving the second heat radiating fins 13a therein. A portion of each second slot 25a for receiving the third heat radiating section 131a is located in one slot 23 corresponding to portions of the slot 23 for receiving the first heat radiating section 121 and the bent section 123. Therefore, when the radiating fins 12 and the second radiating fins 13a are disposed in the slots 23 and the second slots 25a, respectively, each of the third heat radiating sections 131a of the second radiating fins 13a is located between the first and the second heat radiating section 121, 122 of one radiating fin 12 and clamped in the bent section 123 thereof.

Figure 9A:
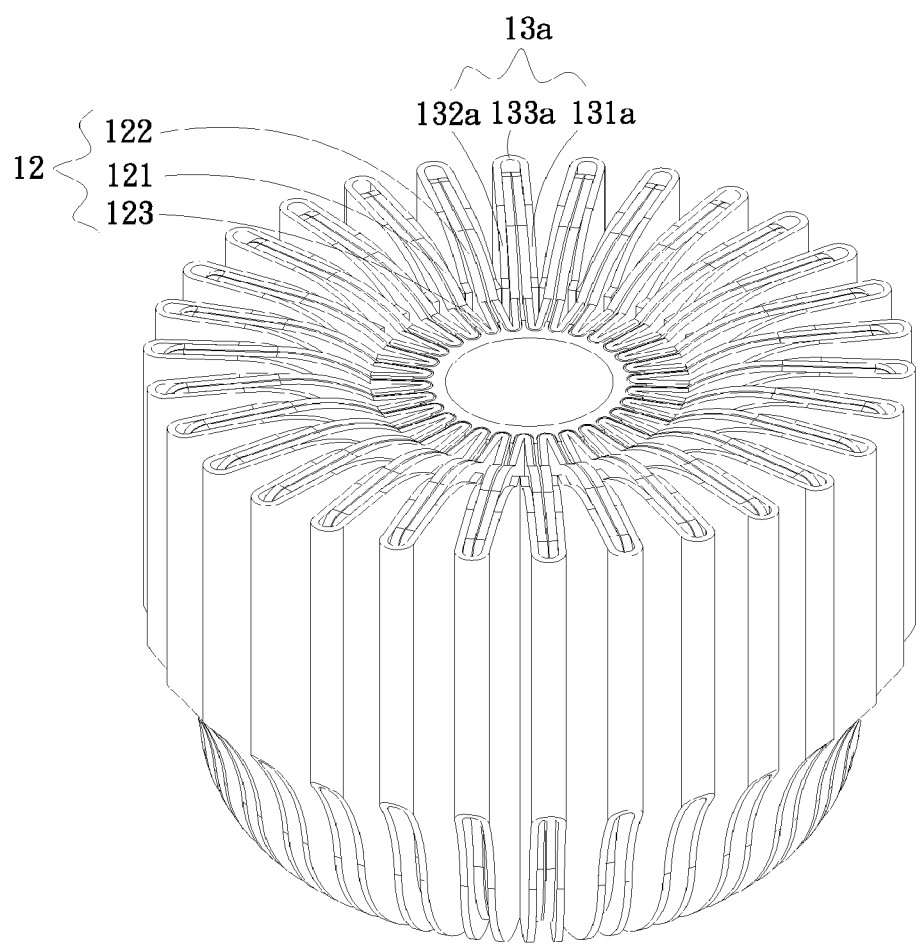
FIG. 9A is an assembled perspective view of a heat sink structure according to a third preferred embodiment of the present invention.
Figure 9B:
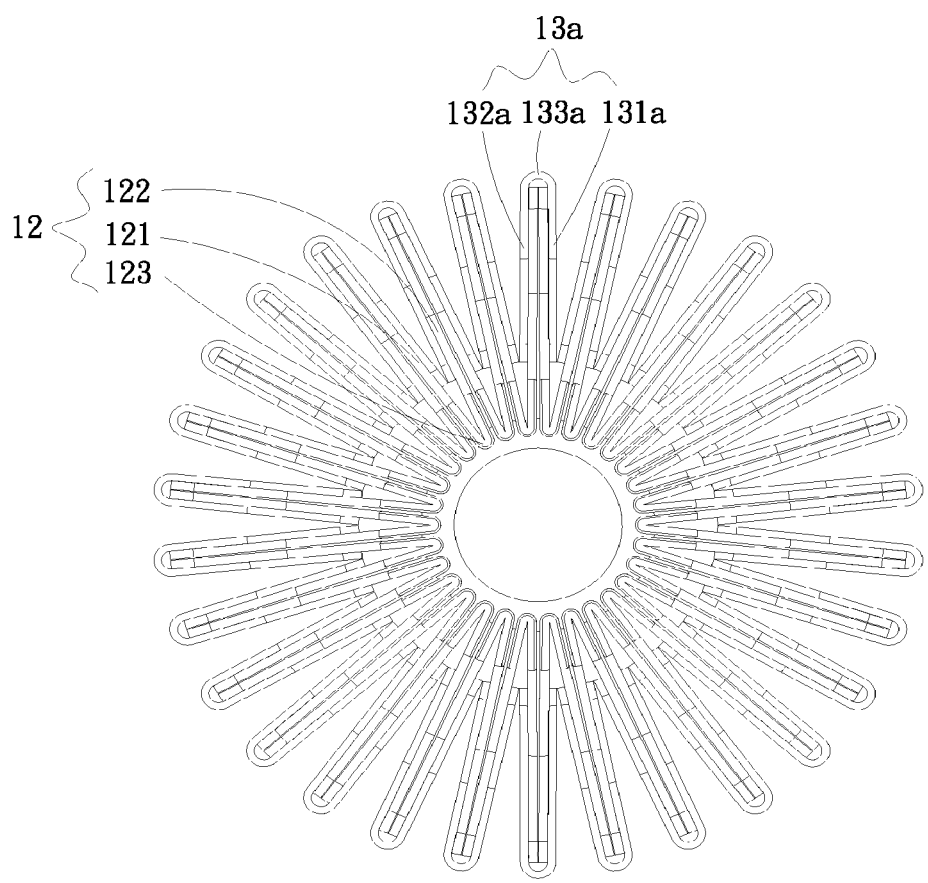
FIG. 9B is a top view of FIG. 9A.

Please refer to FIGS. 9A and 9B that are perspective and top views, respectively, of a heat sink structure 10 according to a third preferred embodiment of the present invention. As shown, the heat sink structure 10 in the third preferred embodiment is generally structurally similar to the second embodiment, except that each of the fourth heat radiating sections 132a of the second radiating fins 13a is located between the first and the second heat radiating section 121, 122 of an adjacent radiating fin 12. More specifically, in the third preferred embodiment, each third heat radiating section 131a is located between the first and the second heat radiating section 121, 122 of one radiating fin 12 and clamped in the bent section 123 of the radiating fin 12; each fourth heat radiating section 132a is located between the first and the second heat radiating section 121, 122 of one adjacent radiating fin 12 and clamped in the bent section 123 of the adjacent radiating fin 12; and each second bent section 133a correspondingly clamps on one first heat radiating section 121 and one second heat radiating section 122 of two adjacent radiating fins 12. In this manner, the radiating fins 12 are structurally reinforced by the third heat radiating sections 131a, the fourth heat radiating sections 132a and the second bent sections 133a of the second radiating fins 13a to provide enhanced heat transfer and heat dissipation effects.

Figure 9C:
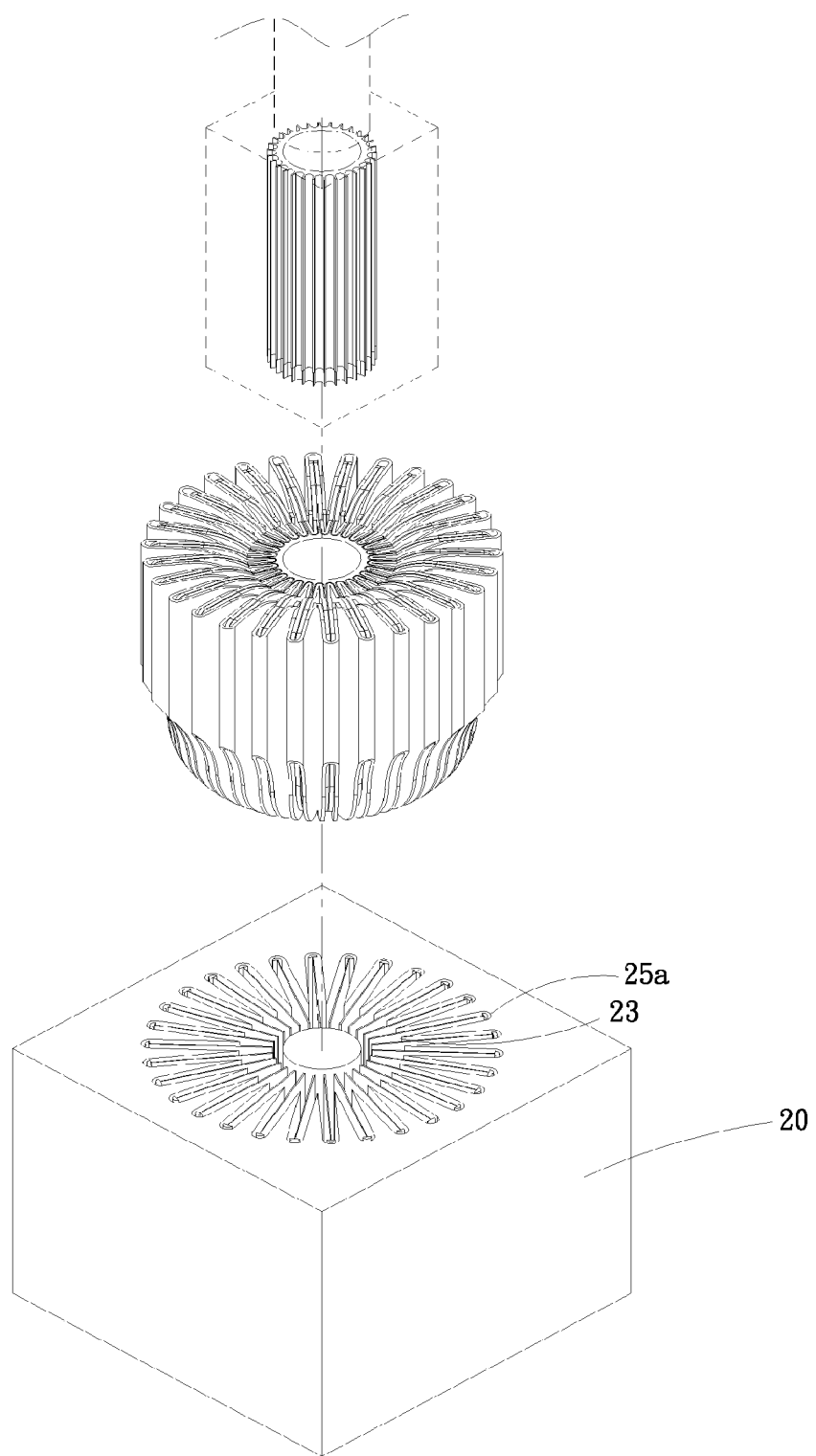
FIG. 9C shows the method of manufacturing heat sink structure according to a third preferred embodiment of the present invention.

FIG. 9C shows the method of manufacturing heat sink structure according to a third preferred embodiment of the present invention. To manufacture the heat sink structure 10 shown in FIGS. 9A and 9B, the forming mold 20 is further provided with a plurality of second slots 25a for correspondingly receiving the second heat radiating fins 13a therein. A portion of each second slot 25a for receiving the third heat radiating section 131a is located in one slot 23 corresponding to portions of the slot 23 for receiving the first heat radiating section 121 and the bent section 123, another portion of each second slot 25a for receiving the fourth heat radiating section 132a is located in an adjacent slot 23 corresponding to portions of the adjacent slot 23 for receiving the second heat radiating section 122 and the bent section 123. Therefore, when the radiating fins 12 and the second radiating fins 13a are disposed in the slots 23 and the second slots 25a, respectively, each of the third heat radiating sections 131a of the second radiating fins 13a is located between the first and the second heat radiating section 121, 122 of one radiating fin 12 and clamped in the bent section 123 thereof, while each of the fourth heat radiating sections 132a of the second radiating fins 13a is located between the first and the second heat radiating section 121, 122 of one adjacent radiating fin 12 and clamped in the bent section 123 thereof.

Figure 10A:
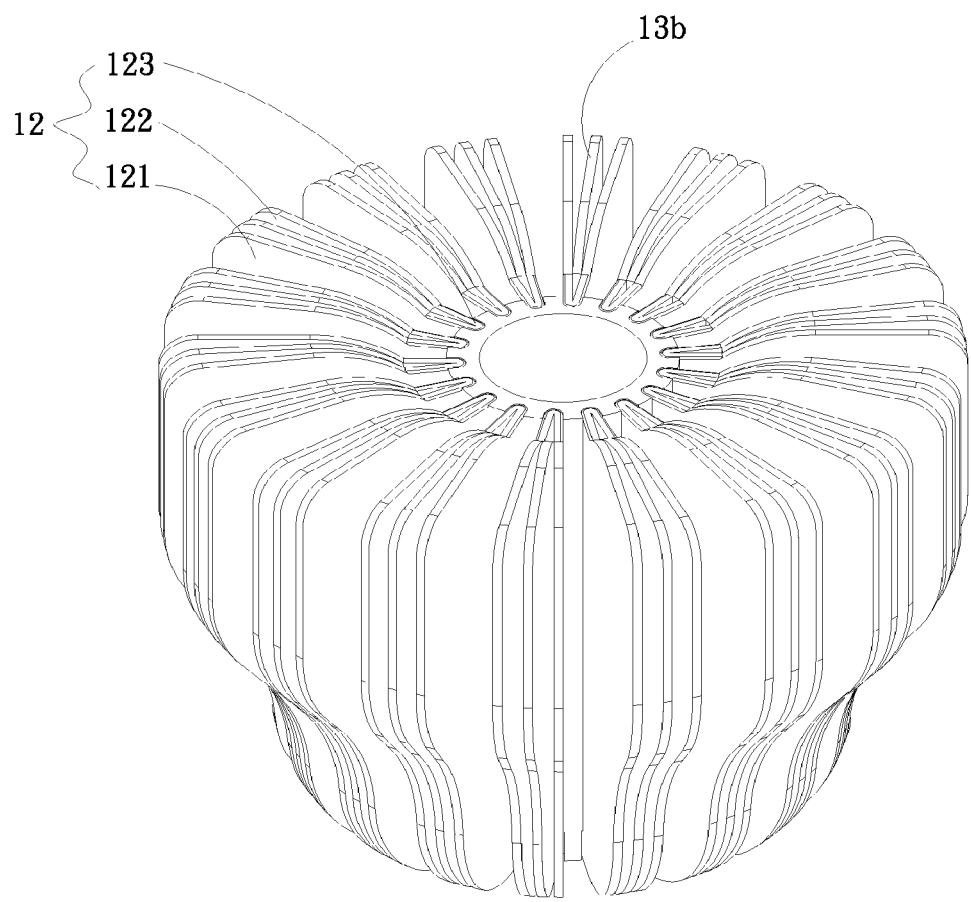
FIG. 10A is an assembled perspective view of a heat sink structure according to a fourth preferred embodiment of the present invention.
Figure 10B:
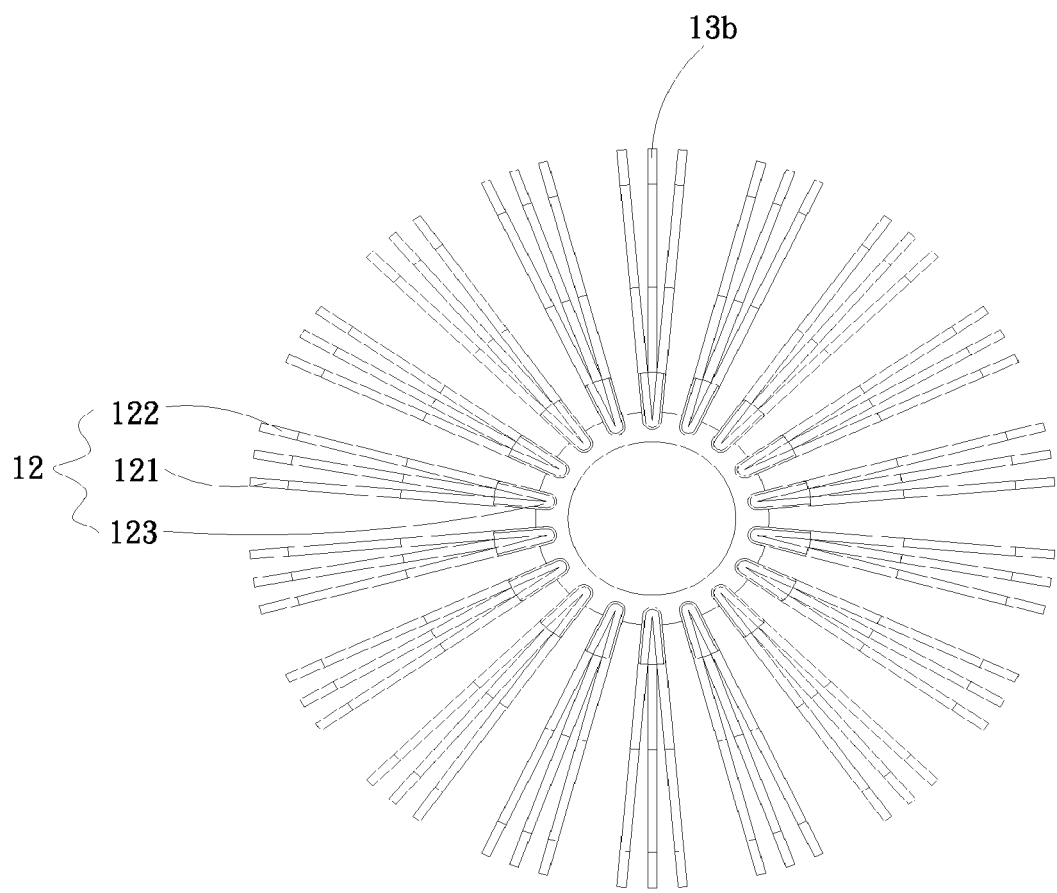
FIG. 10B is a top view of FIG. 10A.

Please refer to FIGS. 10A and 10B that are perspective and top views, respectively, of a heat sink structure 10 according to a fourth preferred embodiment of the present invention. As shown, the heat sink structure 10 in the fourth preferred embodiment is generally structurally similar to the first embodiment, except that it further includes a plurality of second radiating fins 13b. Each of the second radiating fins 13b is located between the first and the second heat radiating section 121, 122 of one radiating fin 12 and clamped in the bent section 123 of the radiating fin 12. In this manner, the radiating fins 12 are structurally reinforced by the second radiating fins 13b to provide enhanced heat transfer and heat dissipation effects.

Figure 10C:
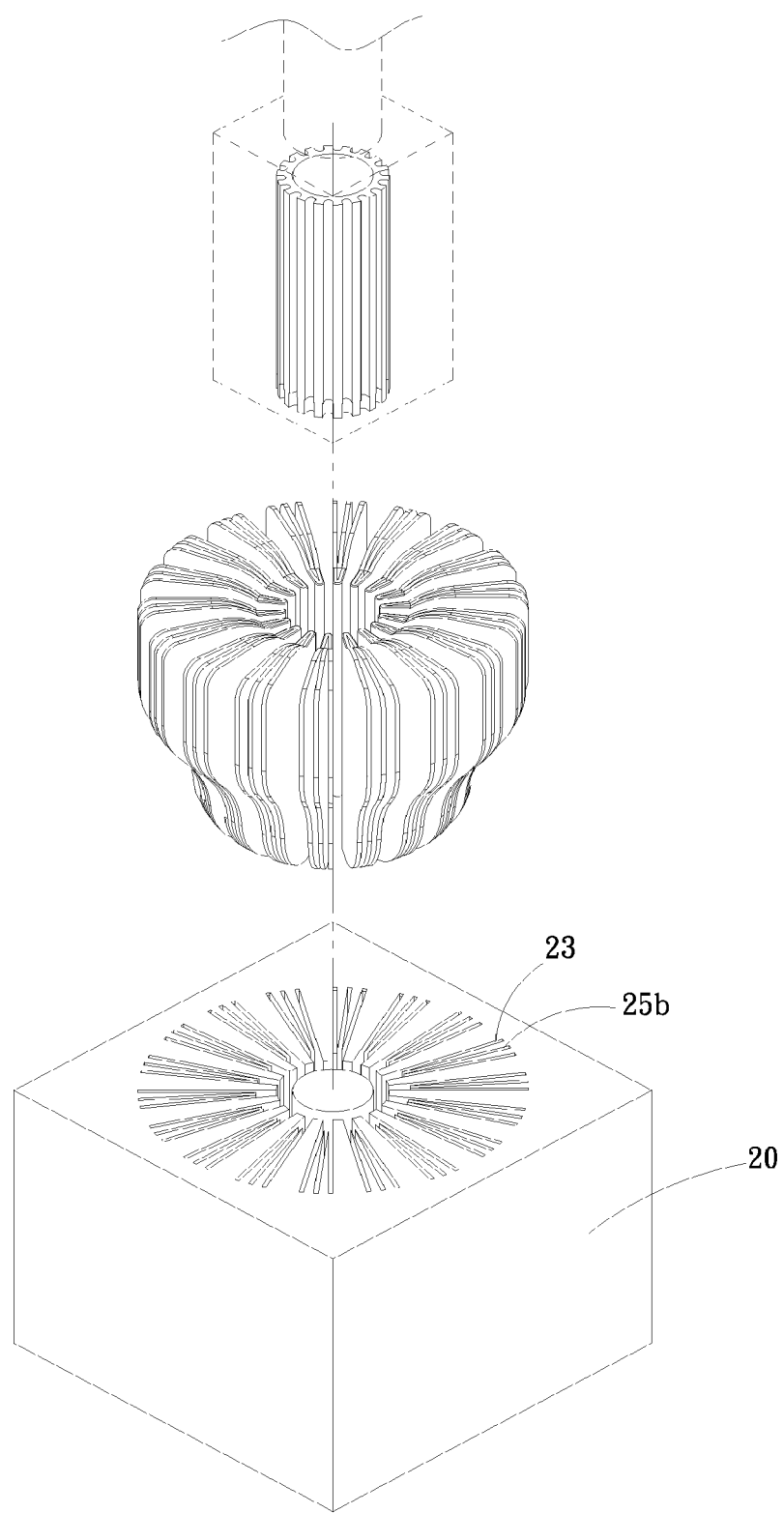
FIG. 10C shows the method of manufacturing heat sink structure according to a fourth preferred embodiment of the present invention.

FIG. 10C shows the method of manufacturing heat sink structure according to a fourth preferred embodiment of the present invention. To manufacture the heat sink structure 10 shown in FIGS. 10A and 10B, the forming mold 20 is further provided with a plurality of second slots 25b for receiving the second radiating fins 13b therein. Each of the second slots 25b is located between two portions of one slot 23 for receiving the first and the second heat radiating section 121, 122 of each radiating fin 12 with a radially inner end of the second slot 25b corresponding to and communicating with the portion of the slot 23 for receiving the bent section 123. Therefore, when the radiating fins 12 and the second radiating fins 13b are received in the slots 23 and the second slots 25b, respectively, each second radiating fin 13b is located between the first and the second heat radiating section 121, 122 of one radiating fin 12 and clamped in between the bent section 123 of the radiating fin 12.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method of manufacturing heat sink structure, comprising the following steps:
providing a forming mold, which has an inner wall surface, a top surface and a plurality of slots; the inner wall surface enclosing an inner space, the slots being radially outward extended from the inner wall surface to locate around and communicate with the inner space, and the slots respectively having an upper end that extends through the top surface;
providing a main body, which is longitudinally extended between a first end and a second end thereof, and has a plurality of coupling flutes circumferentially spaced on an outer surface thereof and longitudinally extended from the first end to the second end; and disposing the first end of the main body in the inner space of the forming mold;
providing a plurality of radiating fins, each of which has a first and a second heat radiating section and a bent section located between the first and the second heat radiating section; correspondingly disposing the first and second heat radiating sections of the radiating fins in the slots with the bent sections of the radiating fins radially projected from the inner wall surface into the inner space of the forming mold; and
using a mechanical process to drive the main body into the inner space at a high speed, so that the main body moves relative to the radiating fins and the bent sections of the radiating fins are forced into the coupling flutes and longitudinally moved along the coupling flutes to the second end of the main body at a high speed, bringing the bent sections and the coupling flutes to tightly connect to one another.

2. The heat sink structure manufacturing method as claimed in claim 1, wherein, in the mechanical process, a gas compressing machine is used to produce a compressed gas for driving the main body into the inner space of the forming mold at a high speed.

3. The heat sink structure manufacturing method as claimed in claim 2, wherein the inner space has a central body disposed therein, and the first end of the main body being disposed in the inner space around the central body.

4. The heat sink structure manufacturing method as claimed in claim 1, wherein the bent section can be formed at a middle portion or at a non-middle portion of the radiating fin, and the first and the second heat radiating section are respectively extended from two lateral portions of the bent section.

5. The heat sink structure manufacturing method as claimed in claim 1, wherein two lateral portions of the bent sections are horizontally tightly pressed against an inner wall surface of the coupling flutes.

6. The heat sink structure manufacturing method as claimed in claim 1, wherein the forming mold further has at least one second slot.

\* \* \* \* \*